(12) United States Patent
Andersen et al.

(10) Patent No.: US 7,949,661 B2
(45) Date of Patent: May 24, 2011

(54) SYSTEM AND METHOD FOR IDENTIFYING WEB COMMUNITIES FROM SEED SETS OF WEB PAGES

(75) Inventors: Reid Marlow Andersen, La Jolla, CA (US); Kevin John Lang, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 257 days.

(21) Appl. No.: 11/510,412

(22) Filed: Aug. 24, 2006

(65) Prior Publication Data

US 2008/0052263 A1 Feb. 28, 2008

(51) Int. Cl.
*G06F 17/00* (2006.01)
(52) U.S. Cl. .................... 707/741; 707/738; 707/798
(58) Field of Classification Search .......... 707/6, 741, 707/738, 798
See application file for complete search history.

(56) References Cited

U.S. PATENT DOCUMENTS

| | | | |
|---|---|---|---|
| 6,272,507 B1 * | 8/2001 | Pirolli et al. | 715/206 |
| 6,654,743 B1 * | 11/2003 | Hogg et al. | 707/7 |
| 6,799,176 B1 * | 9/2004 | Page | 707/5 |
| 2002/0112082 A1 * | 8/2002 | Ko et al. | 709/246 |
| 2002/0129014 A1 * | 9/2002 | Kim et al. | 707/5 |
| 2003/0120630 A1 * | 6/2003 | Tunkelang | 707/1 |
| 2004/0111412 A1 * | 6/2004 | Broder | 707/7 |
| 2005/0086260 A1 * | 4/2005 | Canright et al. | 707/104.1 |
| 2005/0149502 A1 * | 7/2005 | McSherry | 707/3 |
| 2005/0216533 A1 * | 9/2005 | Berkhin | 707/204 |
| 2006/0122998 A1 * | 6/2006 | Bar-Yossef et al. | 707/5 |
| 2008/0082481 A1 * | 4/2008 | Joshi et al. | 707/2 |
| 2008/0243813 A1 * | 10/2008 | Liu | 707/5 |
| 2008/0275902 A1 * | 11/2008 | Burges et al. | 707/102 |

OTHER PUBLICATIONS

GW Flake, S Lawrence, CL Giles, Efficient identification of Web communities, 2000, ACM.*
DA Spielman, SH Teng, Nearly-linear time algorithms for graph partitioning, graph sparsification, and solving linear systems, 2004, ACM.*
Jon M. Kleinberg. Authoritative Sources in a Hyperlinked Environment. Journal of the ACM, 46(5):604-632, 1999.
Ravi Kumar, Prabhakar Raghavan, Sridhar Rajagopalan,and Andrew Tomkins. Trawling the Web for Emerging Cyber-communities. Computer Networks (Amsterdam, Netherlands: 1999).
Daniel A. Spielman and Shang-Hua Teng. Nearly-linear Time Algorithms for Graph Partitioning, Graph Sparsification, and Solving Linear Systems. In ACM STOC-04, pp. 81-90, New.
Reid Andersen, Kevin J. Lang, Communities from Seed Sets, pp. 223-232, Proceedings of the 15th International Conference on World Wide Web, May 23-26, 2006, Edinburgh.

\* cited by examiner

*Primary Examiner* — Charles Kim
*Assistant Examiner* — Kurt Mueller
(74) *Attorney, Agent, or Firm* — Baker Botts L.L.P.

(57) ABSTRACT

An improved system and method is provided for identifying web communities from seed sets of web pages. A seed set of web pages may be represented as a set of seed vertices of a graph representing a collection of web pages. An initial probability distribution may be constructed on vertices of the graph by assigning a nonzero value to the vertices belonging to the seed set. Then a sequence of probability distributions may be produced on the vertices of the graph by modifying the probability distribution over a series of one-step walks of the probability distribution over the vertices of the graph. For each probability distribution produced in the sequence, level sets of vertices may be generated, and a level set with minimal conductance may be selected for each probability distribution. The level set with the least conductance may then be output representing a community of web pages.

24 Claims, 5 Drawing Sheets

SYSTEM AND METHOD FOR IDENTIFYING WEB COMMUNITIES FROM SEED SETS OF WEB PAGES

FIELD OF THE INVENTION

The invention relates generally to computer systems, and more particularly to an improved system and method for identifying web communities from seed sets of web pages.

BACKGROUND OF THE INVENTION

Expanding a seed set of web pages into a larger web community is a common procedure performed in link-based analysis of websites. Although the seed expansion problem has been addressed by numerous researchers as an intermediate step of various graph-analytic analyses on the web, unfortunately existing techniques used for identifying web communities from web pages may be inefficient and provide less than optimal results. In some cases, a larger neighborhood of web pages may be examined than necessary for identifying communities of web pages. In other cases, communities identified may include web pages without a strong relationship to the web community. For instance, the HITS algorithm, well-known in the field, used a search engine to generate a seed set, and then performed a fixed-depth neighborhood expansion in order to generate a larger set of pages upon which the HITS algorithm was employed. The general technique of the HITS algorithm has seen broad adoption, and is now a common technique for local link-based analysis. Variants of this technique have been employed in community finding, in finding similar pages, in pagerank, in trustrank, and in classification of web pages. More sophisticated expansions have been applied in the context of community discovery.

However, expanding a seed set using a fixed-depth expansion may ignore a target community that includes the seed set and may result in rapid expansion from the seed set in the graph before a large fraction of the nodes in the target community have been reached. Thus a fixed depth expansion may result in a bad approximation of the community and may further produce an impractically large candidate set for further processing.

Other techniques have defined a community to be a subgraph bounded by a small cut, which may be obtained by first growing a candidate set and then pruning it back. This process may be repeated several times while adding nodes from the candidate set at each step to ensure expansion of the seed set. Another approach for ensuring a reasonable expansion of a seed set may be to apply graph conductance. Graph conductance, or the normalized cut metric, is a quotient-style metric that may provide an incentive for growing the seed set. But such improvement of a conductance score may come at the expense of adding barely related nodes, or even a disconnected component, to the seed set. As a result, web pages without a strong relationship to the web community may be included in an identified web community.

What is needed is a way to identify communities with conductance guarantees that may also be computed locally by examining only a small neighborhood of the entire graph. Such a system and method should be able to ensure that the included web pages have a strong relationship to the identified web community.

SUMMARY OF THE INVENTION

Briefly, the present invention may provide a system and method for identifying web communities from seed sets of web pages. In an embodiment, a community analysis engine may be provided for finding a community of web pages. The community analysis engine may include an operably coupled probability distribution generator for generating a probability distribution over the vertices of a graph representing a collection of web pages. The community analysis engine may also include an operably coupled diffusion simulator for producing sequences of probability distributions over vertices of the graph and may additionally include an operably coupled conductance analyzer for determining the conductance of level sets of vertices generated from each sequence of probability distributions over vertices of the graph. The set of vertices with the least conductance may be output representing a community of web pages.

The present invention may find a community of web pages from a seed set of vertices of a graph representing a collection of web pages that may include a community of web pages. An initial probability distribution may be constructed on vertices of the graph by assigning a nonzero value to the vertices belonging to the seed set. Then a sequence of probability distributions may be produced on the vertices of the graph by modifying the probability distribution over a series of one-step walks of the probability distribution over the vertices of the graph. For each probability distribution produced in the sequence, level sets of vertices may be generated, and a level set with minimal conductance may be selected for each probability distribution. The level set with the least conductance may then be output representing a community of web pages.

Many applications may use the present invention including applications for finding a neighborhood of vertices in a graph given a set of seed vertices. For instance, a clustering application may find local segments given seed sets of vertices for each segment to be identified. For any of these applications, the present invention may advantageously expand a seed set of vertices into a neighborhood with small conductance and a strong relationship to the seed, while examining only a small neighborhood of the entire graph. Other advantages will become apparent from the following detailed description when taken in conjunction with the drawings, in which:

DETAILED DESCRIPTION

Exemplary Operating Environment

Figure 1:
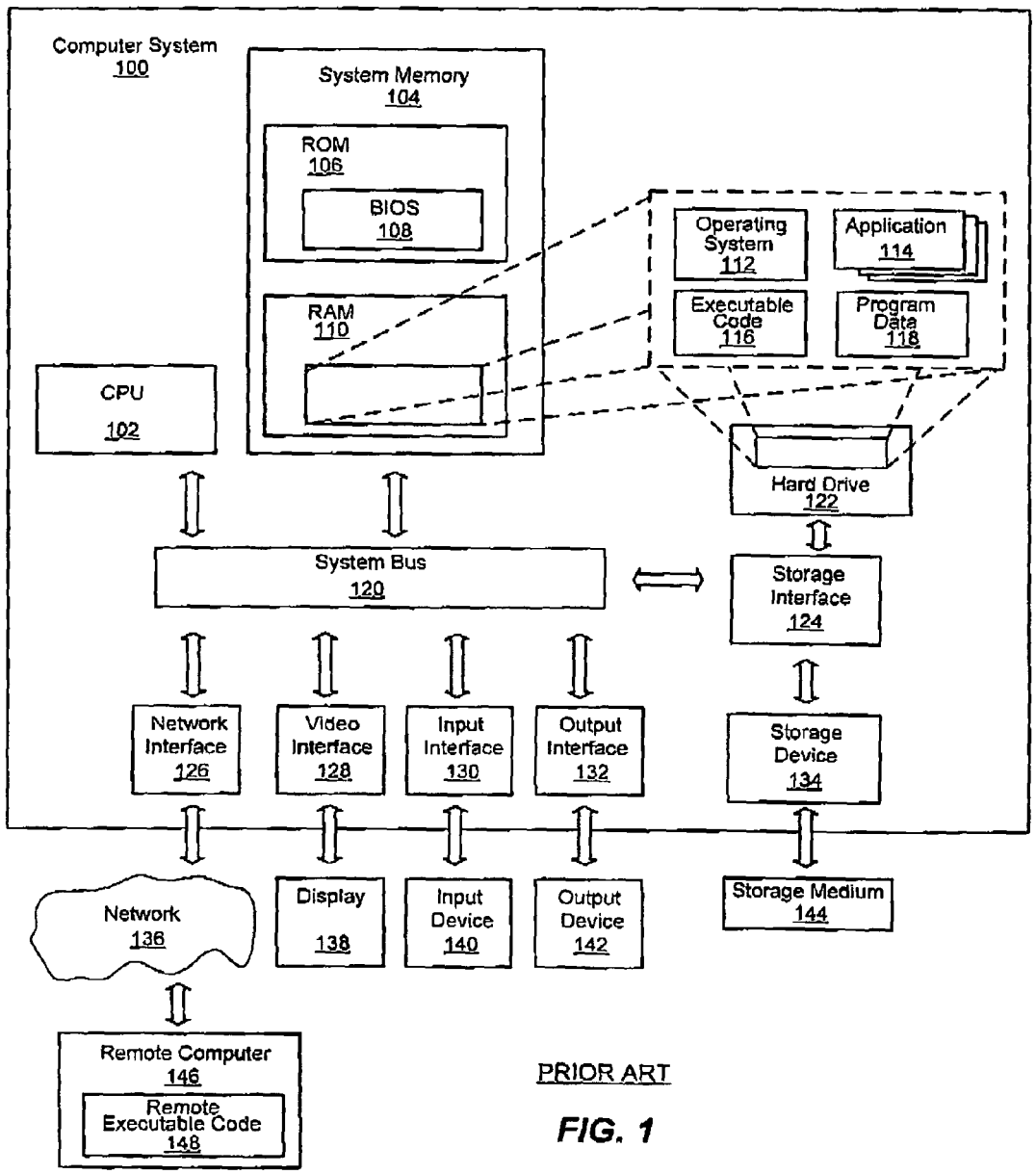
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, nonvolatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used.

Identifying Communities From Seed Sets

The present invention is generally directed towards a system and method for identifying web communities from seed sets of web pages. The present invention may find a community of web pages starting from a seed set of vertices which is representative of that community. Starting from a probability distribution concentrated on the seed set, probability may be spread to neighboring vertices by simulating a truncated random walk for a small number of steps, where during each step probability values may be set to zero at any vertex with probability below a certain threshold. This may bound the number of vertices with nonzero probability and may implicitly determine which vertices may be examined. After each step in the expansion process, a small number of sets of vertices determined by the current random walk distribution may be examined, and upon completing the number of steps of the truncated random walk, one set of such vertices may be chosen to represent the community for the seed set.

A community as used herein may mean a related group of objects. Accordingly, a community of web pages may mean a group of related web pages, and a community of vertices, or neighborhood of a vertices, may mean a group of related vertices of a graph. As will be seen, many applications may use the present invention including applications for finding a neighborhood of vertices in a graph given a set of seed vertices. As will be understood, the various block diagrams, flow charts and scenarios described herein are only examples, and there are many other scenarios to which the present invention will apply.

Figure 2:
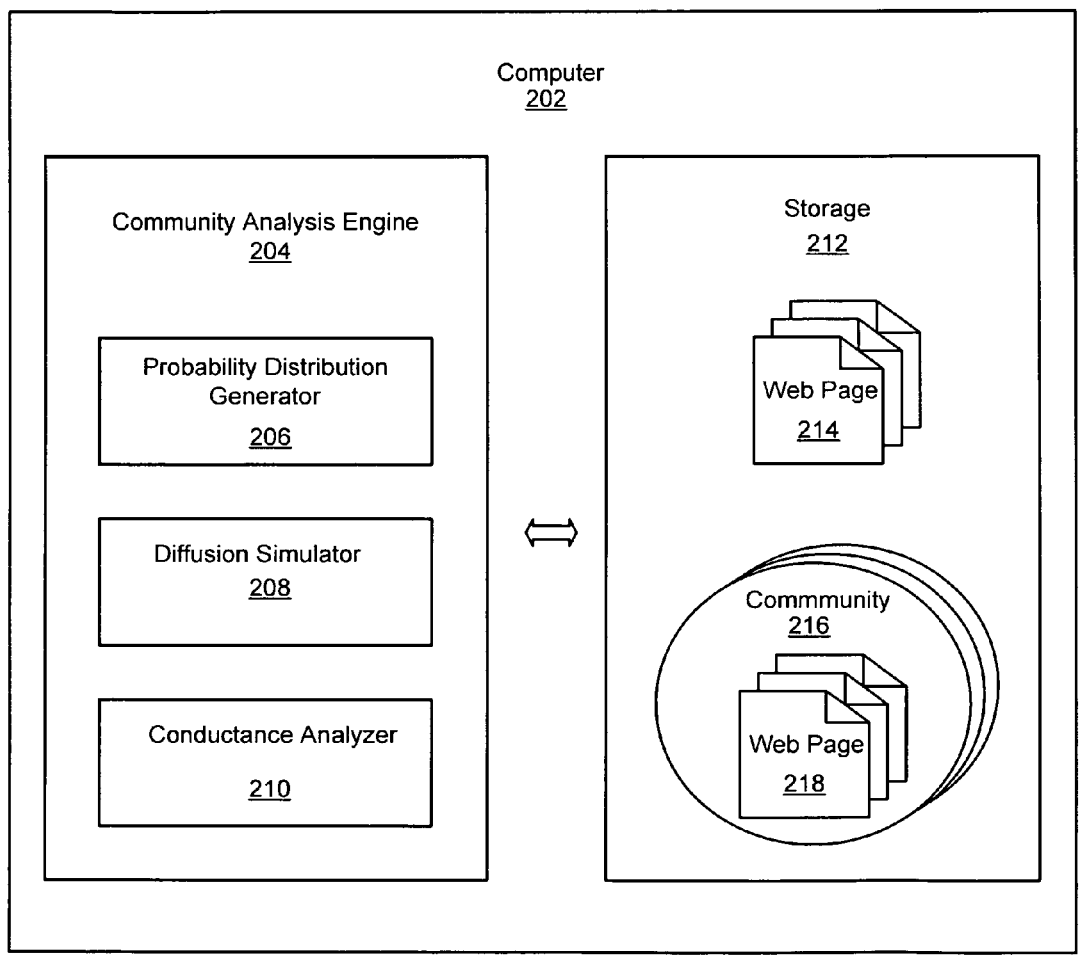
FIG. 2 is a block diagram generally representing an exemplary architecture of system components in an embodiment for identifying web communities from seed sets of web pages, in accordance with an aspect of the present invention.

Turning to FIG. 2 of the drawings, there is shown a block diagram generally representing an exemplary architecture of system components for identifying web communities from seed sets of web pages. Those skilled in the art will appreciate that the functionality implemented within the blocks illustrated in the diagram may be implemented as separate components or the functionality of several or all of the blocks may be implemented within a single component. For example, the functionality for the conductance analyzer 210 may be included in the same component as the diffusion simulator 208. Or the functionality of the probability distribution generator 206 may be implemented as a separate component from the community analysis engine 204.

In various embodiments, a computer 202, such as computer system 100 of FIG. 1, may include a community analysis engine 204 operably coupled to storage 212. In general, the community analysis engine 204 may be any type of executable software code such as a kernel component, an application program, a linked library, an object with methods, and so forth. The storage 212 may be any type of computer-readable media and may store web pages 214, or links to web pages such as URLs, and communities 216 of web pages 218, or links to web pages such as URLs.

The community analysis engine 204 may provide services for grouping web pages 214 into communities 216 of web pages 218. A web page may be any information that may be addressable by a URL, including a document, an image, audio, and so forth. The community analysis engine 204 may include a probability distribution generator 206 for generating a probability distribution over the vertices of a graph representing a collection of web pages, a diffusion simulator for producing sequences of probability distributions over the vertices of a graph representing a collection of web pages, and a conductance analyzer for determining the conductance of level sets generated from each of the probability distributions of the sequence produced by the diffusion simulator. Each of these modules may also be any type of executable software code such as a kernel component, an application program, a linked library, an object with methods, or other type of executable software code. The community analysis engine 204 may create web communities by including web pages that have a strong relationship with each other in the same community.

There are many applications which may use the present invention for identifying a local cluster of web pages. For example, applications that may perform link-based analysis of a graph representing a collection of web pages may use the present invention to identify web communities by examining a small area of the entire graph near the seed set. More particularly, a search application may find similar web pages given a set of web pages; a clustering application may find local segments of web pages; a web page classifier may identify web pages that may belong to a class of web pages, and so forth. For any of these applications using the present invention, a seed set of web pages may be expanded into a community with small conductance and a strong relationship to the seed, while examining only a small neighborhood of the entire graph.

Figure 3:
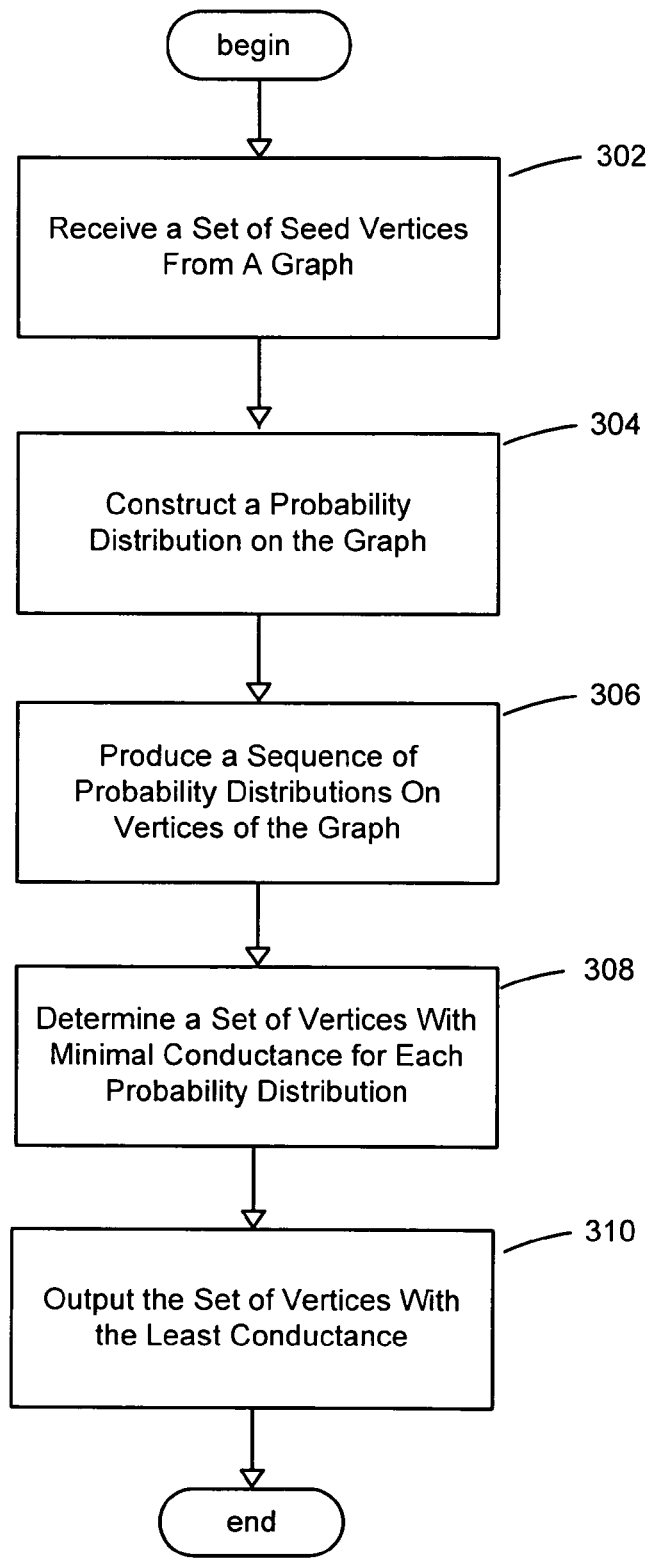
FIG. 3 is a flowchart generally representing the steps undertaken in one embodiment for identifying web communities from seed sets of web pages, in accordance with an aspect of the present invention.

FIG. 3 presents a flowchart generally representing the steps undertaken in one embodiment for identifying web communities from seed sets of web pages. A set of seed vertices from a graph may be received at step 302. The set of seed vertices may represent web pages identified by an application or source as relevant or related, but may represent web pages from different websites. Consider S to be defined to be a seed set of vertices from the graph. Also consider A to denote the adjacency matrix of an undirected graph and consider D to be the diagonal matrix where $D_{i,j}=d(v_i)$ may be the degree of the $i^{th}$ vertex. Then the volume of a set of vertices, S, may be defined to be $$Vol(S) = \sum_{u \in S} d(u).$$

At step 304 a probability distribution may be constructed on the graph. In an embodiment, consider the probability distribution to be:

$$p_0 = \psi_S,$$

$$\text{where } \psi_s = \begin{cases} d(x)/Vol(S) & \text{if } x \in S, \\ 0 & \text{otherwise.} \end{cases}$$

In this embodiment, the seed vertices may be assigned a non-zero probability of $d(x)/Vol(S)$ and non-seed vertices of the graph may be assigned a probability of zero. At step 306, a sequence of probability distributions may be produced on the graph. For example, a diffusion process may be simulated for a fixed number of steps $1, \ldots, T$ producing a sequence of distributions p, for each $t=1, \ldots, T$. In an embodiment, the probability distributions $p_t$ may be determined after t steps of a random walk by the equation $p_t = M^t p_0$, where M may be the random walk transition matrix $$M = \frac{1}{2}(I + AD^{-1}).$$

In practice, 30 to 300 steps may work well for a variety of graphs. At step 308, a set of vertices with minimal conductance for each probability distribution may be determined. And the set of vertices with least conductance may be output at step 310.

Figure 4:
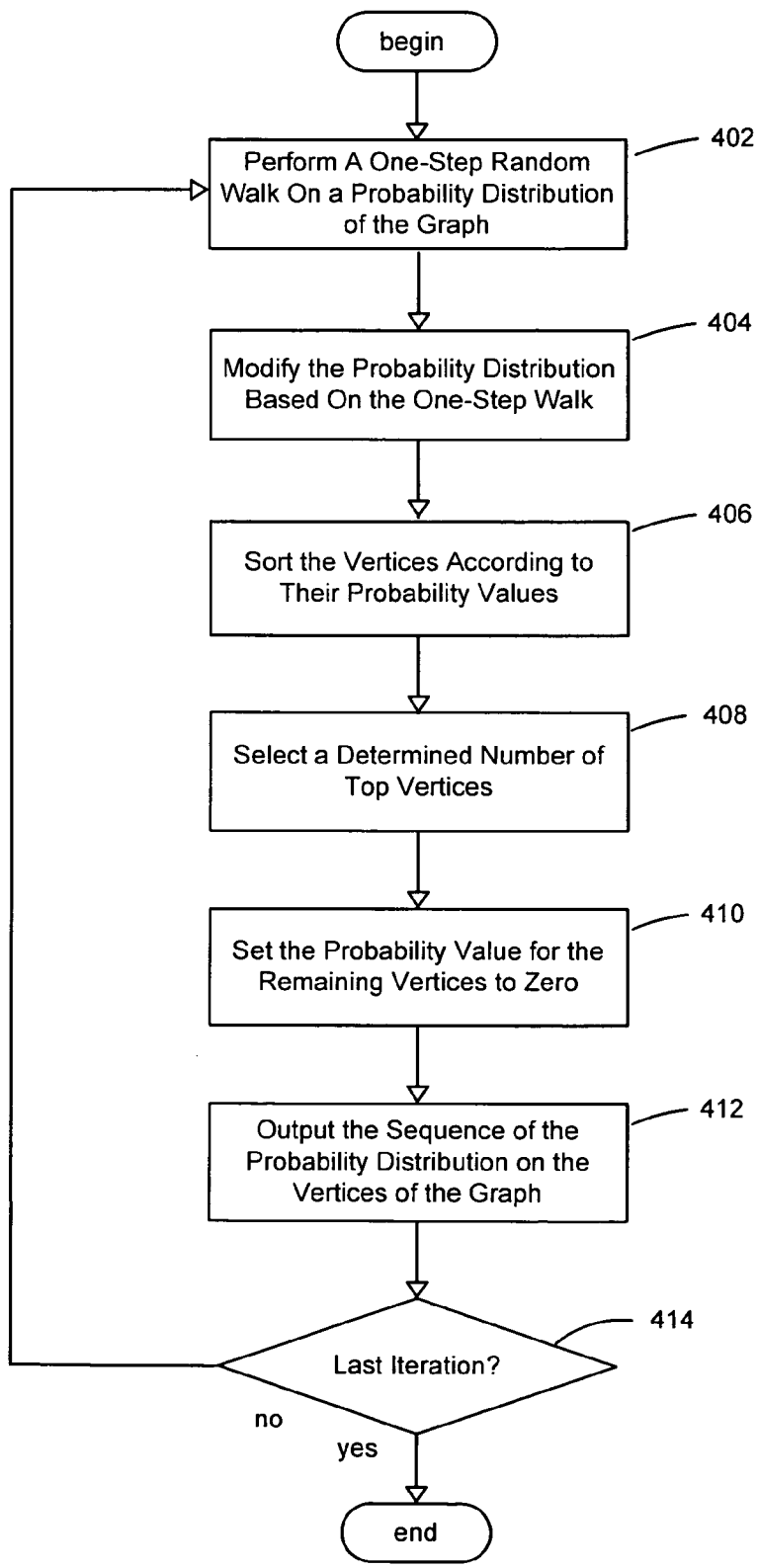
FIG. 4 is a flowchart generally representing the steps undertaken in one embodiment for producing sequences of probability distributions on vertices of a graph, in accordance with an aspect of the present invention.

FIG. 4 presents a flowchart generally representing the steps undertaken in one embodiment for producing sequences of probability distributions on vertices of a graph. In general, a sequence of probability distributions p, may be produced for each t=1, ..., T. In practice, the default number of steps used may be 30 to 300 for a variety of graphs. At step 402 a one-step random walk of the probability distribution of vertices of a graph may be performed. At step 404 the probability distribution may be modified based on the one-step walk. In an embodiment, the probability distributions $p_t$ may be determined from $p_{t-1}$ by performing a one-step random walk to move the probability from $p_{t-1}$ to $p_t$ by setting $p_t = M\, p_{t-1}$. When moving the probability from $p_{t-1}$ to $p_6$ by setting $p_t = M\, p_{t-1}$, it may suffice to consider those vertices where $p_{t-1}(v) \neq 0$ and their neighbors. At step 406 the vertices may be sorted in rank order of their modified probability values. In an embodiment, the vertices may be sorted in descending order according to the degree-normalized probabilities defined by $r_t(v) = p_t(v)/d(v)$, letting $v_i^t$ be the ith vertex in this order so that $r(v_i^t) \geq r(v_{i-1}^t)$.

At step 408, a determined number of top vertices may be selected. In an embodiment, the top j vertices in the sorted order may be selected until the sum of the degrees of the top j vertices may be at least k. The number k may be initialized to the predicted size of the target community in an embodiment. At step 410 the probability values for the unselected vertices of the graph may be set to zero. At step 412, the sequence of the probability distribution for the ranked vertices selected may be output. At step 414 it may be determined whether the last sequence has been produced. If so, then processing may continue at step 402 to produce the next sequence until T one-step random walks may have occurred producing T probability distributions. Otherwise processing may be finished for producing a sequence of probability distributions on vertices of a graph.

Figure 5:
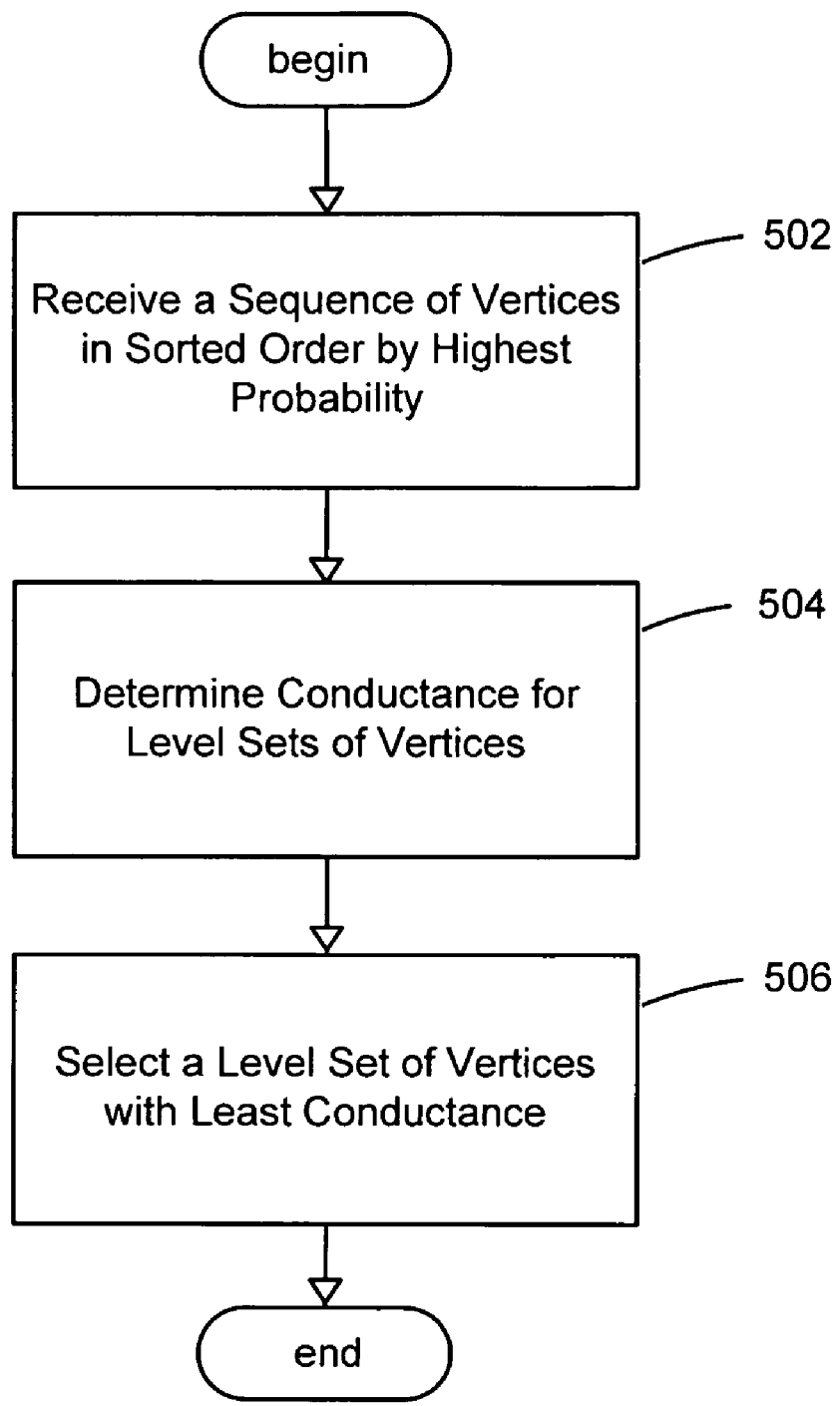
FIG. 5 is a flowchart generally representing the steps undertaken in one embodiment for determining a set of vertices with minimal conductance for a probability distribution on vertices of a graph, in accordance with an aspect of the present invention.

FIG. 5 presents a flowchart generally representing the steps undertaken in one embodiment for determining a set of vertices with minimal conductance for a probability distribution on vertices of a graph. At step 502 a sequence of vertices may be received in sorted order by highest probability value. This may be a sequence of the probability distribution $p_t$ output from step 412 of FIG. 4. At step 504, conductance may be determined for level sets of the sequence of vertices. In an embodiment, there may be J subsets for a sequence of J vertices. For j=1, ..., J, consider S(t,j) to be the set of the first j vertices in this ordering of probability distribution $p_t$. For each level set, S(t,j), the conductance may be computed by dividing the number of edges crossing the community border by the sum of the degrees of vertices in the community. In computing the conductance, it may suffice to consider those level sets S(t,j) where the jth vertex in the ordering of the probability distribution $p_t$ have a nonzero probability from that distribution. At step 506, a level set of vertices with least conductance may be selected. In an embodiment, the total amount of probability p(S(t,j)) on each level set S(t,j) may be calculated by summing $p_t(x)$ over each vertex x in S(t,j). The level set of vertices with least conductance among those level sets where p(S(t,j))>¼ may be selected. After the level set with least conductance has been selected, processing may be finished for determining a set of vertices with minimal conductance for a probability distribution on vertices of a graph.

Finding such a neighborhood of related vertices in a graph given a set of seed vertices may be applied broadly by many different applications. An application performing link-based analysis of websites, for instance, may use the present invention to identify communities of web pages. A search application may use the system and method to find similar web pages given a set of web pages. A web page classifier may use the present invention to identify web pages that may belong to a class of web pages. Those skilled in the art will appreciate that identifying communities from seed sets may be applicable for these and other applications, such as a clustering application for finding local segments given seed sets of vertices for each segment to be identified. For any of these applications, the present invention may advantageously expand a seed set of vertices into a neighborhood with small conductance and a strong relationship to the seed, while examining only a small neighborhood of the entire graph.

Moreover, there are various other embodiments of the present invention when the graph may be directed. For example, the total degree of a vertex, which is its indegree plus its outdegree, may be used in place of its degree in an embodiment for a directed graph. In addition, the random walk may be defined using the adjacency matrix of the directed graph. For each level set, S(t,j), the conductance may be computed by dividing the number of directed edges from S(t,j) to its complement by the sum of total degrees of the vertices in the community.

As can be seen from the foregoing detailed description, the present invention provides an improved system and method for identifying communities from seed sets. Starting from an initial probability distribution concentrated on a seed set, a sequence of probability distributions may be produced on the vertices of a graph by modifying the probability distribution over a series of one-step walks of the probability distribution over the vertices of the graph. For each probability distribution produced in the sequence, level sets of vertices may be generated, and a level set with minimal conductance may be selected for each probability distribution. The level set with the least conductance may then be output representing a community expanded from the seed set. Advantageously, the present invention may efficiently provide a neighborhood of vertices with a strong relationship to the seed set by examining a small neighborhood of a graph. Because the number of vertices examined may represent a small constant multiple of the number of vertices in the target community, a desktop computer may use the present invention to find small communities in a graph that may be too large to fit in main memory of the computer. As a result, the system and method provide significant advantages and benefits needed in contemporary computing and in online applications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:
1. A method comprising:
    accessing, by one or more computing devices, a graph comprising a seed set of vertices representing a seed set of web pages, and a non-seed set of vertices representing a non-seed set of web pages;

assigning, by the one or more computing devices, a non-zero probability to each vertex in the seed set of vertices, and a zero probability to each vertex in the non-seed set of vertices;

determining, by the one or more computing devices, T sequences of probability distribution, denoted as $p_1, \ldots, p_T$, where $T \geq 1$, by iteratively performing a one-step random walk to move probabilities from $p_{t-1}$ to $p_t$, where $2 \leq t \leq T$;

determining, by the one or more computing devices, a level set of vertices with a least conductance for each of the T sequences of probability distribution, $p_t$, where $1 \leq t \leq T$, comprising:

sorting the seed set of vertices and the non-seed set of vertices together in descending order according to their respective probabilities from $p_t$ to obtain a sorted set of vertices;

selecting, from the sorted set of vertices, J top-ranked vertices, where $J \geq 1$;

constructing J level sets of vertices, denoted as $v_1, \ldots, v_J$, using the J top-ranked vertices;

computing a conductance for each of the J level sets of vertices, $v_j$, where $1 \leq j \leq J$; and selecting, from the J level sets of vertices, one level set of vertices having the least conductance as the level set of vertices with the least conductance for $p_t$; and selecting, by the one or more computing devices, from T level sets of vertices determined for the T sequences of probability distribution respectively, one level set of vertices having the least conductance as a set of vertices representing a community of web pages identified from the seed set of web pages.

2. The method of claim 1, wherein determining the T sequences of probability distribution comprises:

determining a first sequence of probability distribution, $p_1$, using a set of non-zero probabilities assigned to the seed set of vertices; and if $T \geq 2$, then determining each subsequent sequence of probability distribution, $p_t$, where $2 \leq t \leq T$, by performing a one-step random walk to move probabilities from $p_{t-1}$ to $p_t$.

3. The method of claim 1, wherein:

selected vertices in the seed set of vertices and the non-seed set of vertices are connected with edges; and when determining the level set of vertices with the least conductance for each of the T sequences of probability distribution, $p_t$, where $1 \leq t \leq T$, the conductance for each of the J level sets of vertices, $v_j$, where $J \leq j \leq$, equals a number of edges crossing a border of $p_t$ divided by a sum of degrees of vertices in $p_t$.

4. The method of claim 1, wherein determining the level set of vertices with the least conductance for each of the T sequences of probability distribution, $p_t$, where $1 \leq t \leq T$, further comprises:

computing a total probability for each of the J level sets of vertices, $v_j$, where $1 \leq j \leq J$; and selecting, from the J level sets of vertices, one level set of vertices having the least conductance and whose total probability is greater than ¼ as the level set of vertices with the least conductance for $p_t$.

5. The method of claim 1, wherein determining the level set of vertices with the least conductance for each of the T sequences of probability distribution, $p_t$, where $1 \leq t \leq T$, further comprises normalizing the probability from $p_t$ of each vertex in the seed set of vertices and the non-seed set of vertices by a degree of the vertex.

6. The method of claim 1, wherein when determining the T sequences of probability distribution, if $T \geq 2$, then for each sequence of probability distribution, $p_t$, where $2 \leq t \leq T$, performing the one-step random walk to move probabilities from $p_{t-1}$ to $p_t$ comprise multiplying $p_{t-1}$ with a random walk transition matrix to obtain $p_t$.

7. The method of claim 1, wherein the non-zero probability assigned to each vertex in the seed set of vertices equals a degree of the vertex divided by a volume of the seed set of vertices.

8. The method of claim 1, wherein J is greater than or equal to a predicted size of the community of web pages identified from the seed set of web pages.

9. A system comprising:

a memory comprising instructions executable by one or more processors; and one or more processors coupled to the memory and operable to execute the instructions, the one or more processors being operable when executing the instructions to:

access a graph comprising a seed set of vertices representing a seed set of web pages, and a non-seed set of vertices representing a non-seed set of web pages;

assign a non-zero probability to each vertex in the seed set of vertices, and a zero probability to each vertex in the non-seed set of vertices;

determine T sequences of probability distribution, denoted as $p_1, \ldots, P_T$, where $T \geq 1$, by iteratively performing a one-step random walk to move probabilities from $P_{t-1}$ to $p_t$, where $2 \leq t \leq T$;

determine a level set of vertices with a least conductance for each of the T sequences of probability distribution, $p_t$, where $1 \leq t \leq T$, comprising:

sort the seed set of vertices and the non-seed set of vertices together in descending order according to their respective probabilities from $p_t$ to obtain a sorted set of vertices;

select, from the sorted set of vertices, J top-ranked vertices, where $J \geq 1$;

construct J level sets of vertices, denoted as $v_1, \ldots, v_j$, using the J top-ranked vertices;

compute a conductance for each of the J level sets of vertices, $v_j$, where $1 \leq j \leq J$; and select, from the J level sets of vertices, one level set of vertices having the least conductance as the level set of vertices with the least conductance for $p_t$; and select from T level sets of vertices determined for the T sequences of probability distribution respectively, one level set of vertices having the least conductance as a set of vertices representing a community of web pages identified from the seed set of web pages.

10. The system of claim 9, wherein determine the T sequences of probability distribution comprises:

determine a first sequence of probability distribution, $p_1$, using a set of non-zero probabilities assigned to the seed set of vertices; and if $T \geq 2$, then determine each subsequent sequence of probability distribution, $p_t$, where $2 \leq t \leq T$, by performing a one-step random walk to move probabilities from $p_{t-1}$ to $p_t$.

11. The system of claim 9, wherein:

selected vertices in the seed set of vertices and the non-seed set of vertices are connected with edges; and when determining the level set of vertices with the least conductance for each of the T sequences of probability distribution, $p_t$, where $1 \leq t \leq T$, the conductance for each of the J level sets of vertices, $v_j$, where $J \leq j \leq$, equals a number of edges crossing a border of $p_t$ divided by a sum of degrees of vertices in $p_t$.

12. The system of claim 9, wherein determine the level set of vertices with the least conductance for each of the T sequences of probability distribution, $p_t$, where $1 \leq t \leq T$, further comprises:
compute a total probability for each of the J level sets of vertices, $v_j$, where $J \leq j \leq$; and
select, from the J level sets of vertices, one level set of vertices having the least conductance and whose total probability is greater than ¼ as the level set of vertices with the least conductance for $p_t$.

13. The system of claim 9, wherein determine the level set of vertices with the least conductance for each of the T sequences of probability distribution, $p_t$, where $1 \leq t \leq T$, further comprises normalize the probability from $p_t$ of each vertex in the seed set of vertices and the non-seed set of vertices by a degree of the vertex.

14. The system of claim 9, wherein when determining the T sequences of probability distribution, if $T \geq 2$, then for each sequence of probability distribution, $p_t$, where $2 \leq t \leq T$, perform the one-step random walk to move probabilities from $p_{t-1}$ to $p_t$ comprise multiply $p_{t-1}$ with a random walk transition matrix to obtain $p_t$.

15. The system of claim 9, wherein the non-zero probability assigned to each vertex in the seed set of vertices equals a degree of the vertex divided by a volume of the seed set of vertices.

16. The system of claim 9, wherein J is greater than or equal to a predicted size of the community of web pages identified from the seed set of web pages.

17. One or more non-transitory computer-readable storage media embodying software operable when executed by one or more computer systems to:
access a graph comprising a seed set of vertices representing a seed set of web pages, and a non-seed set of vertices representing a non-seed set of web pages;
assign a non-zero probability to each vertex in the seed set of vertices, and a zero probability to each vertex in the non-seed set of vertices;
determine T sequences of probability distribution, denoted as $p_1, \ldots, p_T$, where $T \geq 1$, by iteratively performing a one-step random walk to move probabilities from $p_{t-1}$ to $p_t$ where $2 \leq t \leq T$;
determine a level set of vertices with a least conductance for each of the T sequences of probability distribution, $p_t$, where $1 \leq t \leq T$, comprising:
sort the seed set of vertices and the non-seed set of vertices together in descending order according to their respective probabilities from $p_t$, to obtain a sorted set of vertices;
select, from the sorted set of vertices, J top-ranked vertices, where $J \geq 1$;
construct J level sets of vertices, denoted as $v_1, \ldots, v_J$, using the J top-ranked vertices;
compute a conductance for each of the J level sets of vertices, $v_j$, where $1 \leq j \leq J$; and
select, from the J level sets of vertices, one level set of vertices having the least conductance as the level set of vertices with the least conductance for $p_t$; and
select from T level sets of vertices determined for the T sequences of probability distribution respectively, one level set of vertices having the least conductance as a set of vertices representing a community of web pages identified from the seed set of web pages.

18. The media of claim 17, wherein determine the T sequences of probability distribution comprises:
determine a first sequence of probability distribution, $p_1$, using a set of non-zero probabilities assigned to the seed set of vertices; and
if $T \geq 2$, then determine each subsequent sequence of probability distribution, $p_t$, where $2 \leq t \leq T$, by performing a one-step random walk to move probabilities from $p_{t-1}$ to $p_t$.

19. The media of claim 17, wherein:
selected vertices in the seed set of vertices and the non-seed set of vertices are connected with edges; and
when determining the level set of vertices with the least conductance for each of the T sequences of probability distribution, $p_t$, where $1 \leq t \leq T$, the conductance for each of the J level sets of vertices, $v_j$, where $J \leq j \leq$, equals a number of edges crossing a border of $p_t$ divided by a sum of degrees of vertices in $p_t$.

20. The media of claim 17, wherein determine the level set of vertices with the least conductance for each of the T sequences of probability distribution, $p_t$, where $1 \leq t \leq T$, further comprises:
compute a total probability for each of the J level sets of vertices, $v_j$, where $J \leq j \leq$; and
select, from the J level sets of vertices, one level set of vertices having the least conductance and whose total probability is greater than ¼ as the level set of vertices with the least conductance for $p_t$.

21. The media of claim 17, wherein determine the level set of vertices with the least conductance for each of the T sequences of probability distribution, $p_t$, where $1 \leq t \leq T$, further comprises normalize the probability from $p_t$ of each vertex in the seed set of vertices and the non-seed set of vertices by a degree of the vertex.

22. The media of claim 17, wherein when determining the T sequences of probability distribution, if $T \geq 2$, then for each sequence of probability distribution, $p_t$, where $2 \leq t \leq T$, perform the one-step random walk to move probabilities from $p_{t-1}$ to $p_t$ comprise multiply $p_{t-1}$ with a random walk transition matrix to obtain $p_t$.

23. The media of claim 17, wherein the non-zero probability assigned to each vertex in the seed set of vertices equals a degree of the vertex divided by a volume of the seed set of vertices.

24. The media of claim 17, wherein J is greater than or equal to a predicted size of the community of web pages identified from the seed set of web pages.

* * * * *